United States Patent [19]

Sniegocki

[11] Patent Number: 5,758,819
[45] Date of Patent: Jun. 2, 1998

[54] SECURED WASTE CONTAINER ASSEMBLY

[76] Inventor: James Sniegocki, 8901 Blossom La., Louisville, Ky. 40242

[21] Appl. No.: 727,713

[22] Filed: Oct. 7, 1996

[51] Int. Cl.$^6$ ................................................. A47G 29/00
[52] U.S. Cl. ........................ 232/4 D; 232/43.2; 109/46; 109/55
[58] Field of Search .................... 232/1 D, 1 E, 232/4 D, 30, 43.2, 47; 109/46, 55

[56] References Cited

U.S. PATENT DOCUMENTS

| | | |
|---|---|---|
| 814,563 | 3/1906 | Pond . |
| 1,961,662 | 6/1934 | Gamache ................ 232/4 D |
| 2,020,865 | 11/1935 | Abbott et al. ............ 109/4 D X |
| 2,690,870 | 10/1954 | Harman ................... 232/4 D |
| 3,664,576 | 5/1972 | Potvin ................... 232/4 D X |
| 3,683,826 | 8/1972 | Riechmann . |
| 4,046,410 | 9/1977 | Connell ................... 292/36 |
| 4,450,974 | 5/1984 | Winden . |
| 4,714,168 | 12/1987 | Johnson et al. . |
| 4,955,497 | 9/1990 | Winden et al. . |
| 4,972,950 | 11/1990 | Shillington . |
| 5,105,968 | 4/1992 | Fiterman et al. . |
| 5,137,212 | 8/1992 | Fiterman et al. . |

FOREIGN PATENT DOCUMENTS

| | | | |
|---|---|---|---|
| 1463193 | 12/1966 | France .................... | 232/4 D |
| 233499 | 1/1925 | United Kingdom ......... | 232/45 D |
| 517977 | 2/1940 | United Kingdom ......... | 109/46 |

*Primary Examiner*—Blair Johnson
*Attorney, Agent, or Firm*—Middleton & Reutlinger; Charles G. Lamb

[57] ABSTRACT

A secured waste container assembly designed with the appearance of a standard four drawer file cabinet is provided with a slideable movable drawer at the location of the top most drawer and a pivotally attached three-sectional door therebeneath. The slideable drawer is provided with a bottom wall which acts like a tray when the drawer is pulled out of the container housing and the bottom wall pivots downwardly when the drawer is pushed back into the cabinet housing thereby allowing waste material on the bottom wall to fall into an open top container within the cabinet.

5 Claims, 7 Drawing Sheets

SECURED WASTE CONTAINER ASSEMBLY

BACKGROUND OF THE INVENTION

This invention relates generally to a container assembly for the receipt of disposable waste material and particularly a security cabinet for the disposal of confidential papers which has the appearance of a standard file cabinet.

In the present day environment companies, medical facilities, law firms and governmental agencies accumulate information which they consider to be sensitive or proprietary and these organizations would like to keep this information out of the hands of their competitors, litigants in law suits, news media and the general public. These documents if disposed of through normal channels could be picked up by cleaning crews and the like and therefore become generally available to any non-employee of an organization or party disposing of the sensitive or proprietary information. Most business facilities are equipped with in-office shredders which are capable of shredding small quantities of documents but larger quantities of documents, including for example, computer print-outs and the like which are sensitive, are generally collected, stored and then sent to a commercial shredder. On the other hand, some companies have access to commercial shredding machines and on a routine basis, daily, twice weekly or weekly, or the like, use their own employees for shredding this material. In either case, when the organization sends their sensitive or proprietary information out to a commercial shredder or do it in house with their own employees, there is a need for secured containers spaced at selected locations throughout the organization's facilities whereby these large quantities of documents can be disposed, secured, and completely unavailable to non-employees or others without a need to know.

SUMMARY OF THE INVENTION

It is an object of the present invention to provide a secured waste container assembly which may be disguised as an ordinary file cabinet.

It is another object of the present invention to provide a secured waste container assembly with a container therein such that large quantities of waste material can be collected.

It is an additional object of this invention to provide a secured waste container assembly with an open top disposable material container therein wherein access to an open top disposable container is by selected personnel, such as a security service and the like.

More particularly, the present invention provides a secured waste container assembly for the collection of disposable waste of a confidential nature comprising: a housing having a front with a top opening and a bottom opening; a slideable drawer mounted within the housing and movable through the top opening, the drawer having a front wall integral with the front of the housing when in a closed position and said front wall extends outwardly from said front in an open position, the drawer having a pivotally attached bottom wall, the bottom wall being in a horizontal position in an open condition and being in a downward position in a closed condition; a pivotally attached housing door positioned vertically below the front wall of the drawer, closing the bottom opening of the front of the housing in a closed condition; an open top disposable material container dimensioned so as to be removably received within the housing through the second opening; and, means to lock the housing door.

Other objects and features of the present invention will become apparent from the following description of the preferred embodiment of the present invention with reference to the accompanying drawings.

DESCRIPTION OF THE PREFERRED EMBODIMENT

Figure 1:
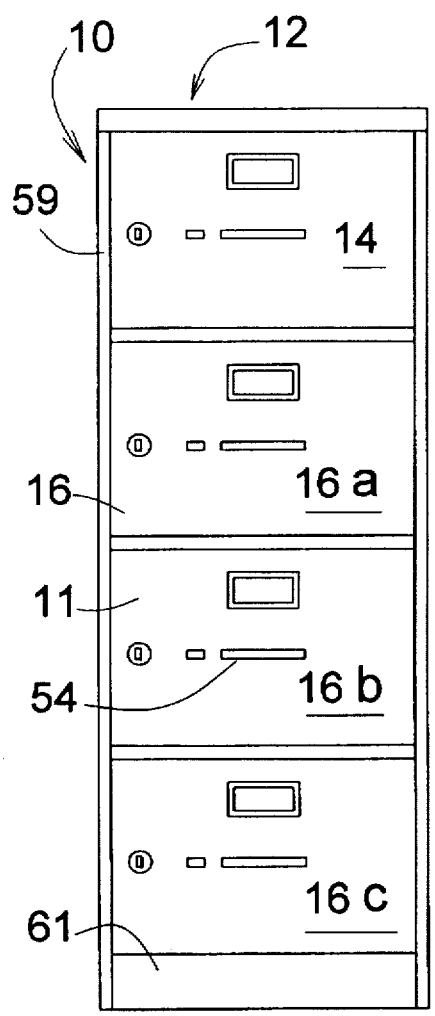
FIG. 1 is a front view of a secured waste container assembly of the present invention.

As shown in FIG. 1, a secured waste container 10 is designed to look like a standard four drawer file cabinet. The secured waste container 10 includes a housing 12 having a front 11 integral with a front wall 14 of a slideable drawer 15 (FIG. 2) and a three-sectional door 16 with each section looking like a front of a file cabinet drawer, the sections being identified by the numerals 16a for the top section, 16b for the middle section and 16c for the lower section.

Referring now to FIGS. 2–6, the housing 12 is provided with a horizontally extending track 22 which extends from the front 11 to the back 13 wherein the track 22 is of channel-shaped configuration to receive a pair of rollers 24a, 24b attached at opposite ends of rack assembly 20 which is attached to the sides of the slideable or movable drawer 15. The pair of front rollers 24a are provided on opposite sides of the front portion of the drawer 15, only one pair of rollers 24a being shown, with a pair of aligned rollers 24b attached near the rear or back portion of the drawer 15 thereby providing for the slideable movement of the drawer 15 in and out of the top opening 44 in the front 11.

Figure 3:
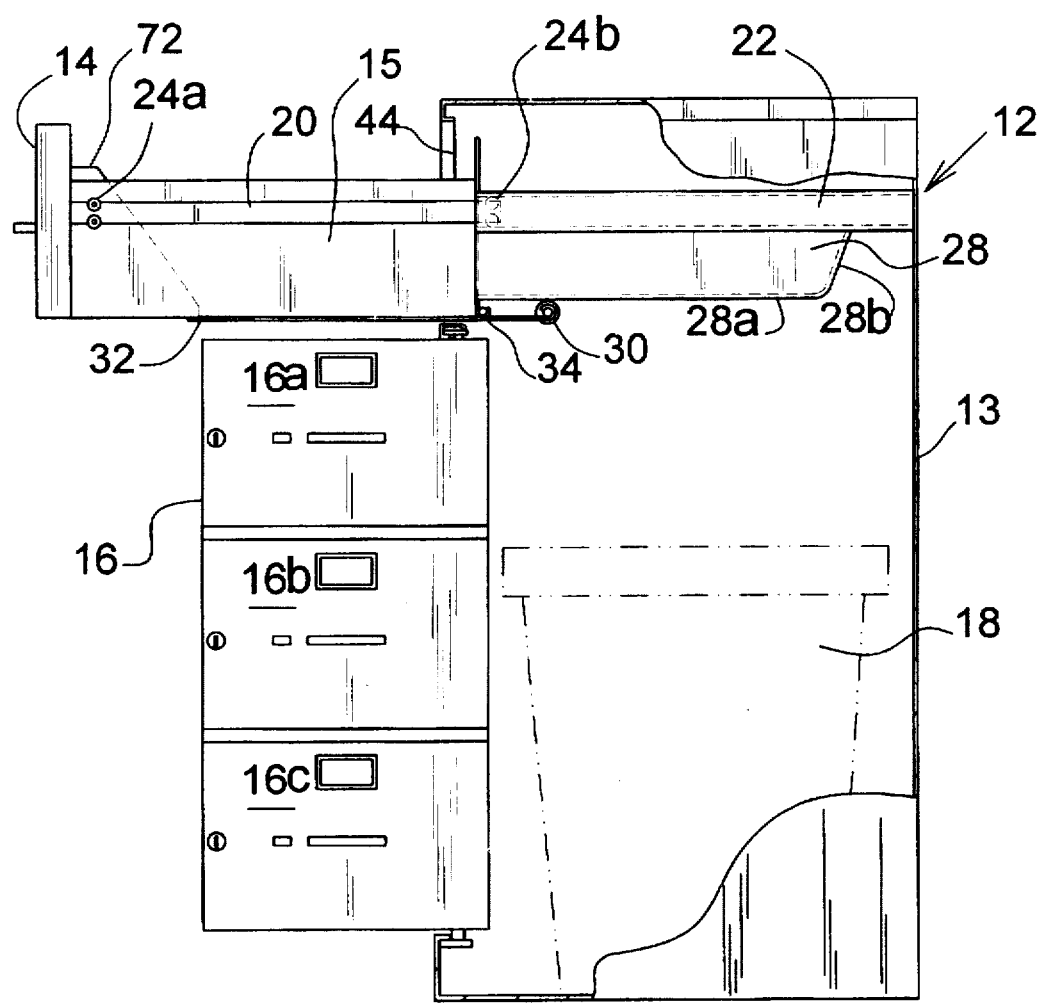
FIG. 3 is also a side view of the secured waste container assembly of FIG. 1, with selected portions cut-away, and showing a slideable drawer in an open condition and a pivotally attached housing door positioned in an open condition.
Figure 4:
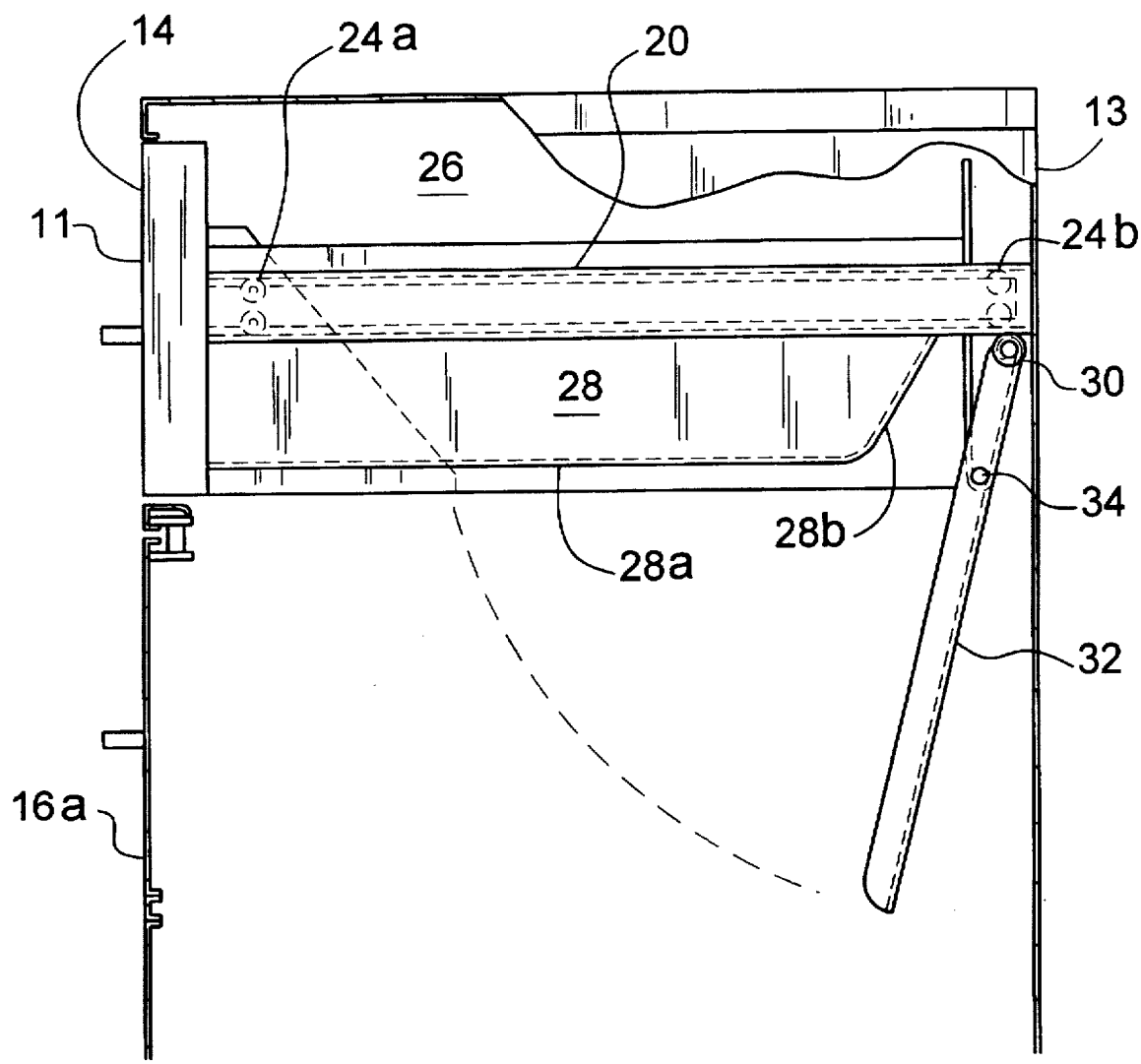
FIG. 4 is an enlarged side view, with selected portions cutaway, of the container assembly of FIG. 1 with the slideable drawer and housing door in a closed condition.
Figure 5:
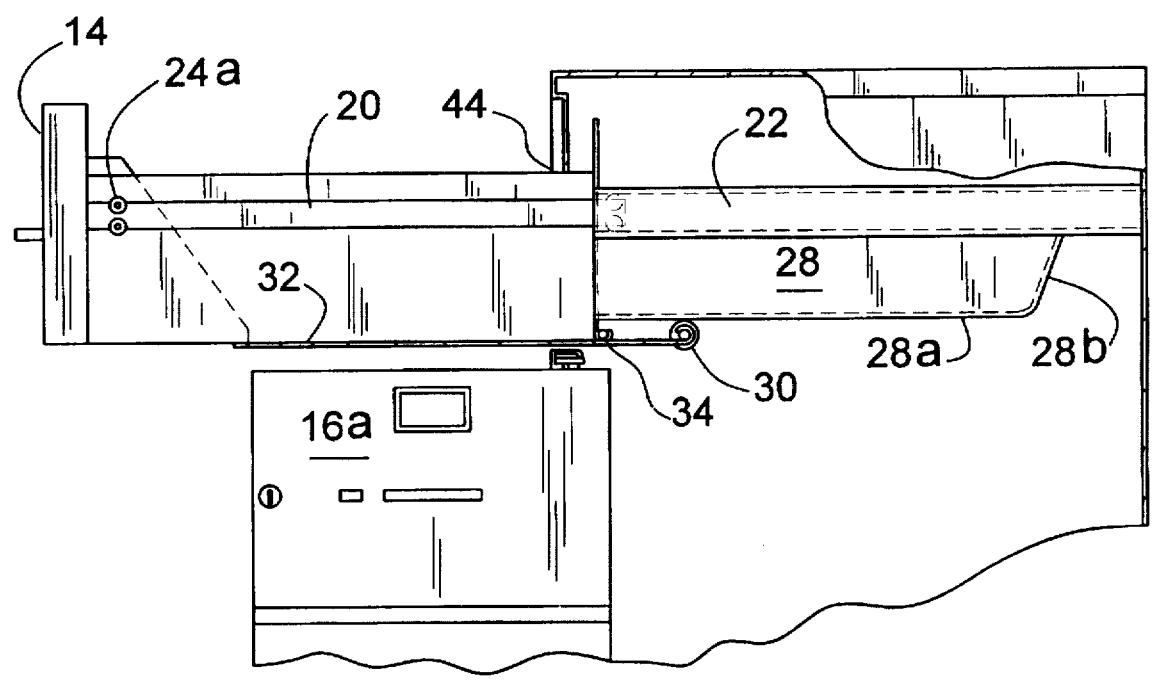
FIG. 5 is an enlarged side view of the secured waste container assembly of FIG. 1 showing the slideable drawer and the housing door in opened conditions.

Slideable drawer 15 is provided with a bottom wall 32 which is pivotally attached at its back section to the back section of drawer 15 by a pivot pin 34, bottom wall 32 extending from the back of the drawer 15 toward the front of the drawer 15, but terminating at a selected distance from the front a sufficient distance so that in its pivotal movement the wall 32 clears the front of the container 10. A trapezoidal shaped box 72 fills in the front portion of the drawer 15 between the terminating front end of the bottom wall 32 and the front portion of the drawer 15. The bottom wall 32 is provided at its back most point with a cam follower which, as shown in FIG. 6, includes a pair of rollers 30 mounted on opposed ends of a horizontally extending shaft 31 which extends from one side of drawer 15 to the opposite side of the drawer 15 wherein the rollers 30 follow the cam surface identified by the numerals 28a, 28b of cam 28, as best shown in FIG. 3.

Figure 2:
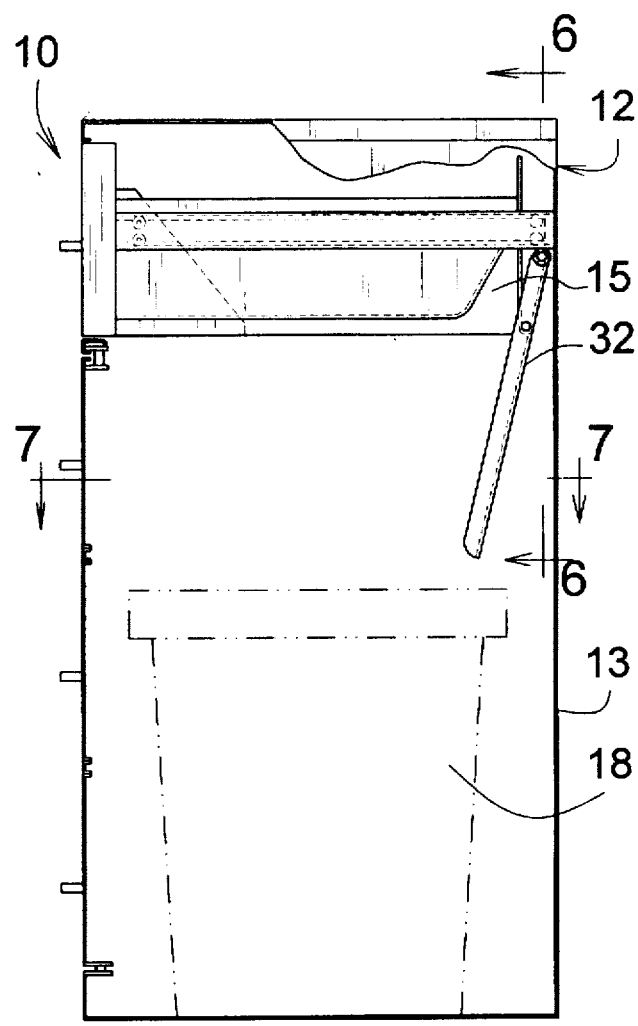
FIG. 2 is a side view of the secured waste container assembly of FIG. 1, with selected portions cut-away and including phantom lines outlining a container for the receipt of waste material.
Figure 6:
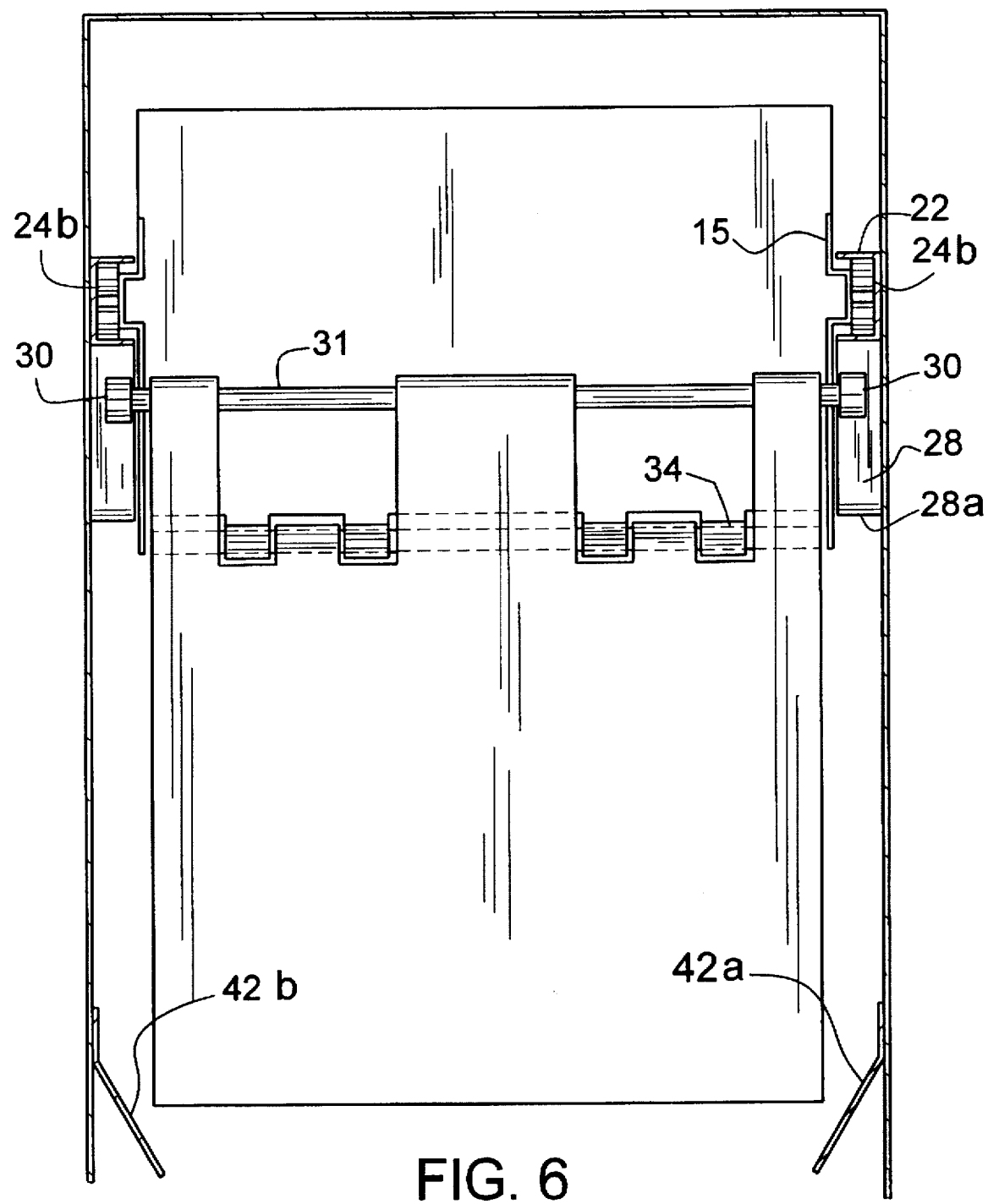
FIG. 6 is a partial sectional view of the container assembly taken along lines 6—6 of FIG. 2; and, FIG. 7 is a partial sectional view of the container assembly taken along the lines 7—7 of FIG. 2; and, FIG. 8A is a plan view of the back of a door of the present invention showing one preferred locking device in a locked condition; and, FIG. 8B is a plan view of the door of FIG. 8A in an unlocked condition.

As best shown in FIG. 6, a pair of waste material guides 42a, 42b are disposed on opposite sides of the housing 12 to guide or deflect material into a waste container 18 as shown in FIG. 2. Guide members 42a, 42b extend downwardly and are angled inwardly from a preselected location along the interior surfaces of side walls of the housing 12.

Figure 7:
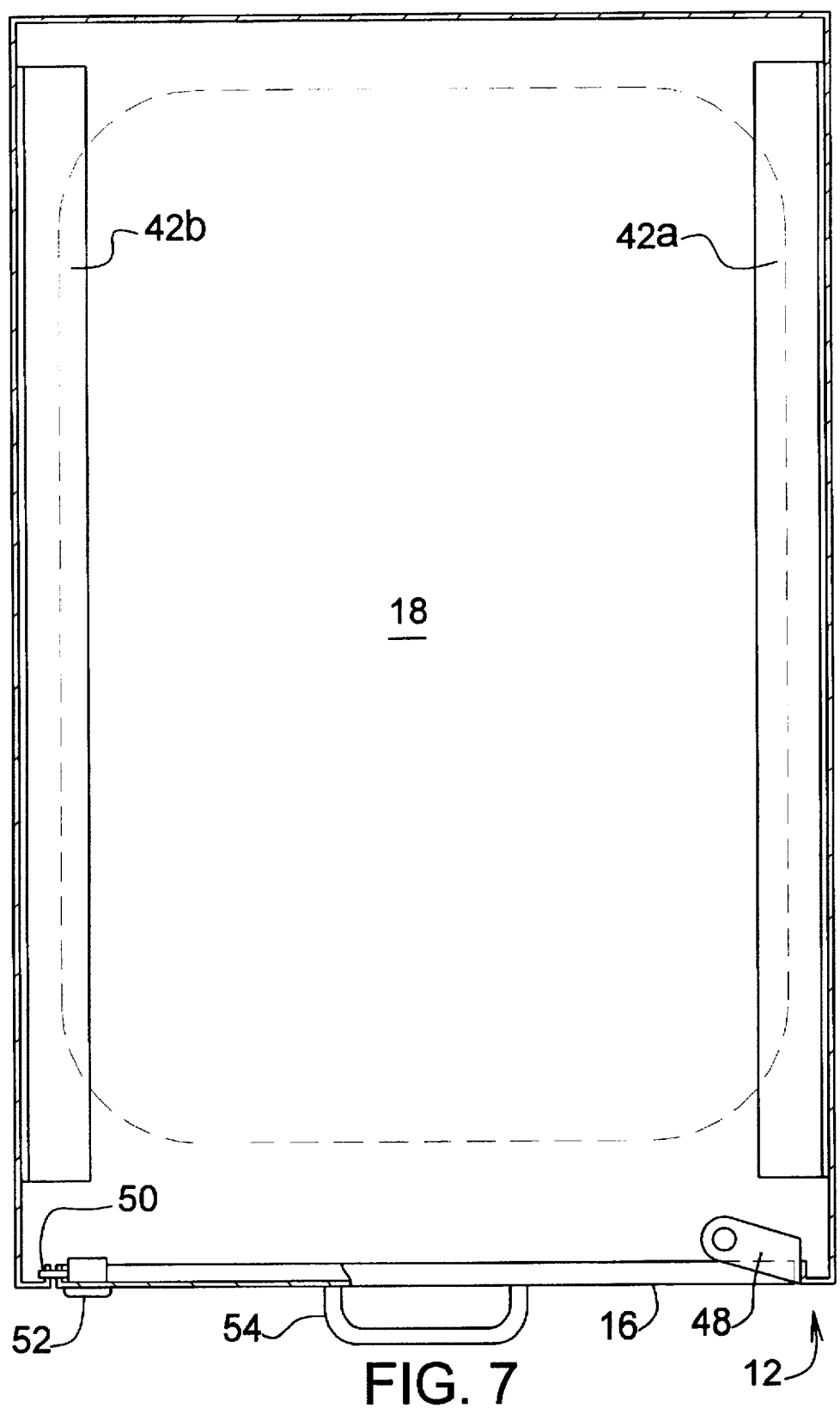

In FIG. 7 is shown one means for securing or locking the three-sectional door cover 16 thereby providing for ingress and egress of the housing 12. The door 16 is pivotally attached to housing 12 with a hinge assembly 48. A key-type locking device shown as lock assembly 50 with cooperating key housing 52 is shown, but it is realized that any standard locking arrangement for securing or locking a door member may be utilized. A handle 54 attached to door 16 is also provided for ease in moving door 16 from one position to a second position.

Figure 8A:
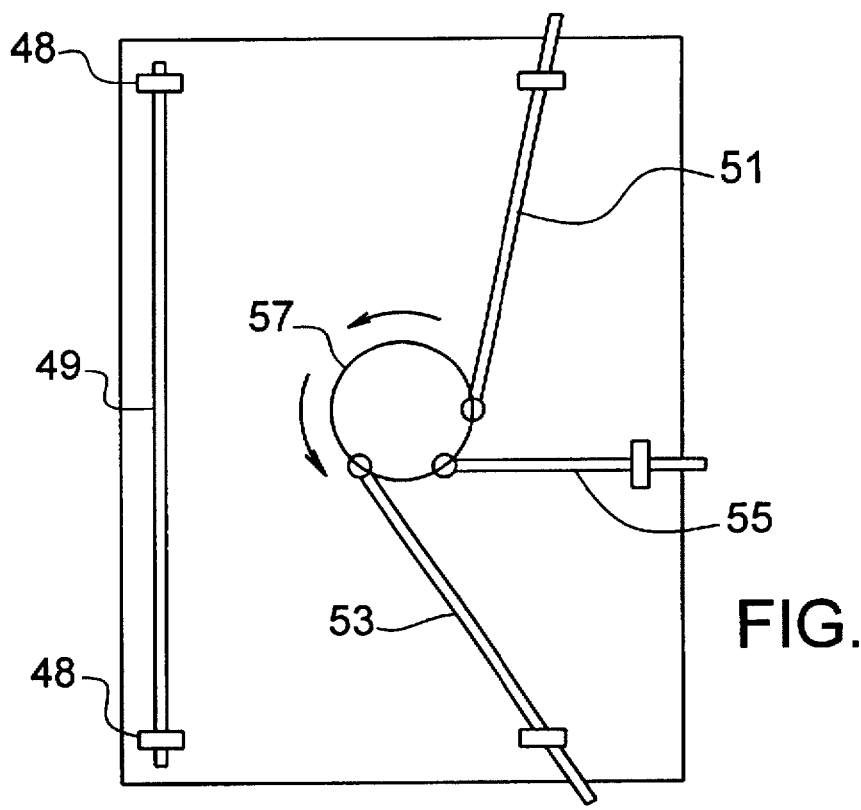
Figure 8B:
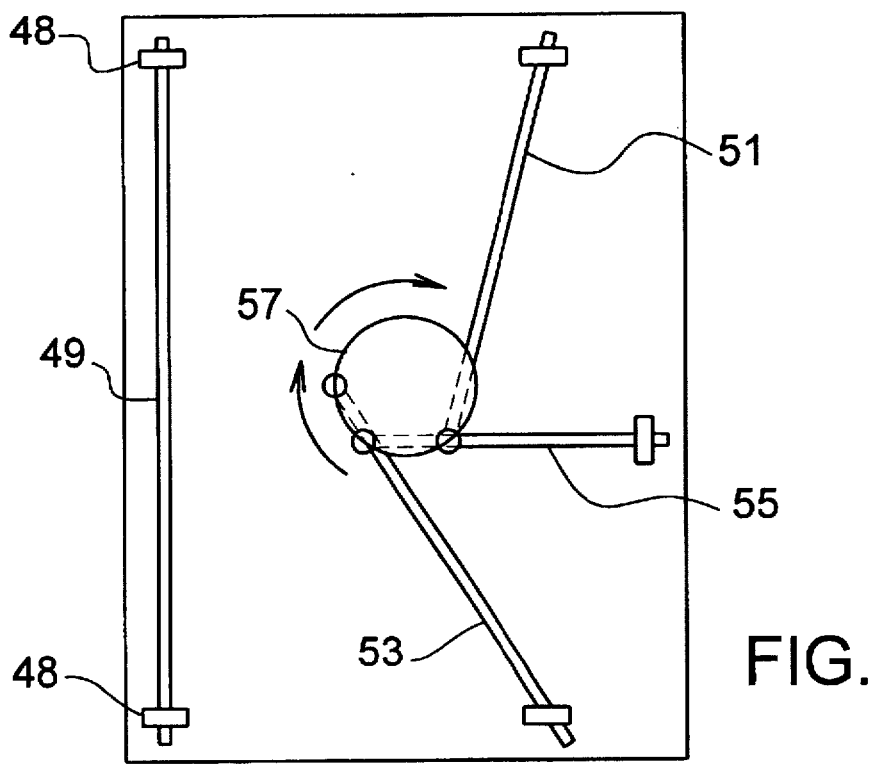

In FIGS. 8A and 8B is shown another preferred means for securing or locking the three-sectional door 16. In this preferred embodiment the three-sectional door 16 is secured on both sides and at the top and the bottom wherein the locking mechanism includes three movable rods identified by the numerals 51, 53 and 55 pivotally attached to rotatable cylinder 57. In a locked condition the bar 51 engages with the back side of the front elongated support member 74 (FIG. 1), the bar 53 engages with a back side of a bottom support member 61 (FIG. 1) of the housing 12, and the bar 55 engages with the back side of the vertically extending support flange member 59 (FIG. 1). The handle 54 is movable in response to a key operated locking mechanism at the key opening identified by the key entry 76, as shown in FIG. 1. The key operated locking mechanism is not shown, but may be any well known locking mechanism known in the art and preferably includes a latch member engageable with the rod 55 when rod 55 is in the locked position as shown in FIG. 8A. The rotatable cylinder 57 is movable in response to the movement of the handle 54. As shown in FIG. 8B, when the handle 54 is raised the cylinder 57 is turned thereby disengaging the bars 51, 53 and 55 thereby allowing the door 16 to be opened providing access to the open top container 18 as shown in FIG. 2. Also, as shown in FIGS. 8A and 8B, the door 16 is attached to the housing by hinge assemblies 48 and a vertically extending hinge pin 49.

In operation of a secured waste container of the present invention, when waste material, such as confidential papers and the like, are to be disposed of, drawer 15 is pulled outwardly from its closed condition within housing 12. Cam follower 30 which is attached to bottom wall 32 follows the surface of the cam from a vertical position to a horizontal position. Once drawer 15 extends to its outermost position, bottom wall 32 is substantially horizontal. Waste is then placed into the drawer 15 and the drawer 15 is pushed inwardly through top opening 44. As the drawer 15 moves inwardly bottom wall 32 pivots downwardly and the waste materials fall by gravity into open top container 18. Thus, if the door 16 is locked, even though drawer 15 is unlocked, waste material is secured within the housing 12 until door 16 is opened While preferred embodiments of the present invention have been described in detail as referenced to the attached drawings, it is understood that various modifications and changes may be made in the secured waste container assembly without departing from the spirit and scope of the appended claims.

What is claimed is:

1. A secured waste container assembly for the collection of disposable waste of a confidential nature comprising:

a housing having a front with a top opening and a bottom opening;

a slideable drawer mounted within said housing and movable through said top opening, said drawer having a front wall and a drawer back section, said front wall aligned with said front of said housing when in a closed condition and extends outwardly from said front in an open condition, said drawer having a bottom wall with a bottom wall back section, said bottom wall back section being pivotally attached to said drawer back section, said bottom wall being pivotal in response to cam means whereby said bottom wall is in a horizontal position in a drawer open condition and is in a downward position in a drawer closed condition;

a pivotally attached housing door positioned below said front wall of said drawer, said housing door closing said bottom opening of said housing in a closed condition;

an open top disposal material container dimensioned so as to be removably received within said housing through said bottom opening; and, means to lock said housing door.

2. The container assembly of claim 1, said bottom wall back section including a cam follower, the cam follower following a cam surface of a cam disposed on at least one vertical side wall of said housing.

3. The container assembly of claim 1, said bottom wall having a terminating front end spaced from said housing front when said drawer is in an open position.

4. The container assembly of claim 1, said housing having a pair of spaced sidewalls with aligned parallel horizontally extending tracks on each sidewall, said slideable drawer having a pair of spaced rollers at a front of said drawer and a pair of spaced rollers at said drawer back section, said rollers being movable within said pair of tracks.

5. The container assembly of claim 1, said means to lock said housing door comprises a locking mechanism having three movable rods pivotally attached to a cylinder central disposed on a back side of said housing door, each of said movable rods being in engaging relation with a support member of said housing.

* * * * *